United States Patent
Bangalore et al.

(10) Patent No.: US 7,996,214 B2
(45) Date of Patent: Aug. 9, 2011

(54) SYSTEM AND METHOD OF EXPLOITING PROSODIC FEATURES FOR DIALOG ACT TAGGING IN A DISCRIMINATIVE MODELING FRAMEWORK

(75) Inventors: Srinivas Bangalore, Morristown, NJ (US); Vivek Kumar Rangarajan Sridhar, Goleta, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 789 days.

(21) Appl. No.: 11/933,739

(22) Filed: Nov. 1, 2007

(65) Prior Publication Data
US 2009/0119102 A1 May 7, 2009

(51) Int. Cl.
G10L 15/02 (2006.01)
G10L 15/14 (2006.01)
G10L 13/00 (2006.01)

(52) U.S. Cl. ......... 704/207; 704/230; 704/240; 704/255
(58) Field of Classification Search ............... 704/236, 704/240, 243, 255, 256.3, 256.8, 270, 207, 704/230
See application file for complete search history.

(56) References Cited

U.S. PATENT DOCUMENTS

| | | | |
|---|---|---|---|
| 7,265,691 B2 * | 9/2007 | Tomic | 341/87 |
| 7,529,667 B1 * | 5/2009 | Gorin et al. | 704/240 |
| 7,542,903 B2 * | 6/2009 | Azara et al. | 704/257 |
| 7,716,056 B2 * | 5/2010 | Weng et al. | 704/275 |
| 7,783,473 B2 * | 8/2010 | Bangalore et al. | 704/2 |
| 7,853,451 B1 * | 12/2010 | Gupta et al. | 704/257 |
| 2006/0129393 A1 * | 6/2006 | Oh et al. | 704/234 |
| 2007/0033004 A1 * | 2/2007 | Bangalore et al. | 704/9 |
| 2008/0162111 A1 * | 7/2008 | Bangalore et al. | 704/2 |
| 2008/0162117 A1 * | 7/2008 | Bangalore et al. | 704/10 |
| 2010/0082326 A1 * | 4/2010 | Bangalore et al. | 704/3 |
| 2010/0131260 A1 * | 5/2010 | Bangalore et al. | 704/3 |

OTHER PUBLICATIONS

Rangarajan et al., "Acoustic-Syntactic Maximum Entropy Model for Automatic Prosody Labeling", IEEE Spoken Lanugage Technology Workshop, Dec. 10-13, 2006, pp. 74 to 77.*
Venkataraman et al., "Training a prosody-based dialog act tagger from unlabeled data", 2003 IEEE International Conference on Acoustics, Speech, and Signal Processing, 2003. Proceedings. ICASSP '03, vol. 1, pp. 1-272 to 1-275.*
Stolcke et al., "Dialogue Act Modeling for Automatic Tagging and Recognition of Conversational Speech", 2000, Computational Linguistics, vol. 26, No. 3, pp. 340 to 373.*
Zimmerman et al., "A based joint segmentation and classification of dialog acts in multiparty meetings", 2005 IEEE Workshop on Automatic Speech Recognition and Understanding, Nov. 27, 2005, pp. 215 to 219.*
Yoshimura et al., "Pitch pattern clustering of user utterances in human-machine dialog", Proc. Of IC-SLP, vol. 2, pp. 837-840, 1996.
Mast et al., "Dialog act classification with the help of prosody", in Proceedings of ICSLP, pp. 1732-1735, 1996.
Ries, K., "IMM and neural network based speech act detention", in Proc. Of ICASSP, vol. 1, pp. 497-500, Mar. 1999.

(Continued)

*Primary Examiner* — Martin Lerner

(57) ABSTRACT

Disclosed are a system and method for exploiting information in an utterance for dialog act tagging. An exemplary method includes receiving a user utterance, computing at periodic intervals at least one parameter in the user utterance, quantizing the at least one parameter at each periodic interval, approximating conditional probabilities using an n-gram over a sliding window over the periodic intervals and tagging the utterance as a dialog act based on the approximated conditional probabilities.

20 Claims, 1 Drawing Sheet

OTHER PUBLICATIONS

Stolcke, et al. "Dialog act modeling for conversational speech," in *Applying Machine Learning to Discourse Processing. Papers from the 1998 AAAI Spring Symposium. Technical Report SS-98-01* (J. Chu-Carroll and N. Green, eds.), (Stanford, CA), pp. 98-105, AAAI Press, Menlo Park, CA, Mar. 1998.

Jurafsky, et al., "Automatic detection of discourse structure for speech recognition and understanding," in *Proceedings of ASRU*, (Santa Barbara, CA), pp. 88-95, Dec. 1997.

Shriberg, et al., "Can prosody aid the automatic classification of dialog acts in conversational speech?," *Language and Speech*, vol. 41, No. 3-4, pp. 439-487, 1998.

Jurafsky, et al. "Lexical, prosodic, and syntactic cues for dialog acts," in *Proc. ACL/COLING Workshop on Discourse Relations and Discourse Markers*, (Montreal, Canada), pp. 114-120, Aug. 1998.

Venkataraman, et al. "Automatic dialog act labeling with minimal supervision," in *Proc. 9th Australian International Conference on Speech Science and Technology*, (Melbourne), Dec. 2002.

Black et al., "Predicting the intonation of discourse segments from examples in dialogue speech," in *Proceedings of the ESCA Workshop on Spoken Dialogue Systems*, May 1995.

Taylor et al., "Intonation and dialogue context as constraints for speech recognition," *Language and Speech*, vol. 41, No. 34, pp. 493-12, 2000.

Lavie, et al., "Dialogue processing in a conversational speech translation system," in *Proc. Of ICSLP*, pp. 554-557, Oct 1996.

Reithinger et al., "Predicting dialogue acts for a speech-to-speech translation system," in *Proc. of ICSLP*, vol. 2, pp. 654-657, Oct 1996.

Fernandez et al., "Dialog act classification from prosodic features using support vector machines," in *Proceedings of Speech Prosody*, pp. 291-294, 2002.

Mrozinski, et al., "Automatic sentence segmentation of speech for automatic summarization," in *Proceedings of ICASSP*. May 14-19, 2006.

* cited by examiner

SYSTEM AND METHOD OF EXPLOITING PROSODIC FEATURES FOR DIALOG ACT TAGGING IN A DISCRIMINATIVE MODELING FRAMEWORK

BACKGROUND OF THE INVENTION

1. Field of the Invention

The present invention relates to spoken dialog systems and more specifically to exploiting information in an utterance for dialog act tagging.

2. Introduction

Speech acts or dialog acts, as understood by a person of ordinary skill in the art of spoken dialog systems, are characterizations of actions performed by a speaker during the course of a conversation or a dialog. This characterization provides a representation of conversational function and is especially useful in systems that require an automatic interpretation of dialog acts to facilitate a meaningful response or reaction. With the growing demand for integrated approaches to speech recognition, understanding, translation and synthesis, dialog act modeling has come to provide an important link in facilitating human-computer interactions.

Automatic interpretation of dialog acts has been addressed through two main approaches: first, the AI-style plan IS AN inferential interpretation of dialog acts that is designed through plan-inference heuristics; and second, the cue-based interpretation that uses knowledge sources such as, lexical, syntactic, prosodic and discourse-structure. Even though the plan-inference method can theoretically account for all variations in discourse, it is time-consuming in terms of manual design and computational overhead. On the contrary, data-driven cue-based approaches are computationally friendly and offer a reasonably robust framework to model and detect dialog acts automatically.

Automatic data-driven dialog act tagging is typically statistical in nature and uses various machine learning algorithms, known to skilled artisans. For example, machine learning algorithms useful for automatic data-driven dialog act tagging can include n-gram models, hidden markov models, maximum entropy models, neural networks, etc. Typically, these statistical models either use a flat chunk and label paradigm, or a hierarchical grammar-based framework to model the dependencies and relations among dialog turns. These statistical models can also exploit multiple knowledge sources in the form of lexical (word identity, keywords), syntactic (parts-of-speech, syntactic structure), prosodic (pitch contour, pitch accents, boundary tones) or discourse structure (dialog history) cues as features in the identification of dialog acts. In particular, prosody, the study of rhythm, intonation, and related attributes in speech, has been a very useful feature in automatic data-driven dialog act tagging. Prosody is domain-independent and can help to describe changes in the syllable length, loudness, pitch, and formant structure of speech sounds, as well as the tone, intonation, rhythm, and lexical stress of speech sounds. Prosody can also help to describe changes in the speech articulators, for example, the velocity and range of motion in articulators like the jaw and tongue, along with quantities like the air pressure in the trachea and the tensions in the laryngeal muscles. Prosody has received a fair amount of attention in cue-based dialog act tagging. Prosodic features such as parameterizations of the pitch contour, duration of segments, energy, as well as categorical representation of pitch accents and boundary tones have been successfully used to improve dialog act tagging.

Prosodic features have been used in dialog act tagging in three major ways: (i) raw/normalized pitch contour, duration and energy, or transformations thereof, (ii) discrete categorical representations of prosody through pitch accents and boundary tones, and (iii) parametric representation of pitch contour.

Prosodic decision trees have been used to model the raw/normalized prosodic features. In this context, duration, pauses, pitch and speaking rate features have been used as a prosodic feature vector. Such prosodic decision trees have resulted in dialog act detection accuracies of 38.9% on the Switchboard-DAMSL dataset, which has been extensively used for dialog act tagging. Of course, a dialog act detection accuracy of 38.9% is only marginally better than chance (35%). Using the original word transcripts in an n-gram modeling framework with 'offline' optimal decoding has resulted in dialog act detection accuracies of 72%. In other cases, symbolic representation of prosodic events have been employed as additional features in dialog act tagging within speech-to-speech translation systems.

Parametric representations of the pitch contour in dialog act classification have also been employed. On a subset of the Maptask corpus (DCIEM Maptask corpus), which has been used extensively for dialog act tagging, accuracies of 69% have been achieved using the parametric representation of intonation. Prosodic features have been shown to improve dialog act tagging accuracy marginally for automatically recognized transcripts, as prosodic features offer more discrimination compared to possibly incorrect lexical information from the ASR. In sum, the incorporation of prosodic features in dialog act tagging has not resulted in significant improvements over dialog act tagging based only on lexical and syntactic features.

Dialog act tagging has been successfully integrated in speech recognition, speech understanding, text-to-speech synthesis and speech translation systems. Several corpora with domain-specific annotation schemes have been created to facilitate automatic learning of dialog acts. A significant problem persists, however, because these corpora must be hand-labeled for each utterance with a domain-specific dialog act tag set.

Accordingly, what is needed in the art is an approved method for utilizing data information in audio for improved dialog act tagging.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Embodiments of the present invention relate to systems and methods for exploiting information in an utterance for dialog act tagging. A computer-readable medium storing instructions for controlling a computer device to exploit information in an utterance for dialog act tagging is also disclosed as an embodiment of the invention. Other configurations of the described embodiments of the invention are also within the scope of this invention.

An exemplary method embodiment of the invention includes receiving a user utterance, computing at periodic intervals at least one parameter in the user utterance, quantizing the at least one parameter at each periodic interval, approximating conditional probabilities using an n-gram over a sliding window over the periodic windows, and tagging the utterance as a dialog act based on the approximated conditional probabilities.

Additional method embodiments within the scope of the present invention can be identified by further defining the at least one parameter in the user utterance, which is computed at periodic intervals. For example, in a preferred method embodiment of the invention, the at least one parameter in the user utterance comprises a pitch and an energy. In a related method embodiment, the energy and pitch are normalized and only the pitch is quantized. In another preferred embodiment the at least on parameter comprises an acoustic-prosodic feature. In a particularly preferred embodiment, the at least one parameter comprises at least one of acoustic-prosodic, lexical, syntactic, and syntax-based prosodic cues. These additional specifications of the at least one parameter are, of course, equally applicable to system embodiments of the invention, as well as, embodiments relating to a computer-readable medium storing instructions for controlling a computer device.

According to the present invention, the at least one parameter in the user utterance is not only computed at periodic intervals, but also quantized at each periodic interval. In a preferred embodiment of the invention, the quantized at least one parameter at the periodic intervals over at least a portion of the utterance can be used as a feature vector for a user with the n-gram model.

Additional method embodiments within the scope of the present invention can be identified by further specifying how conditional probabilities are approximated using an n-gram over a sliding window over the periodic intervals. For example, in one embodiment, the conditional probability can be further approximated based on a length of the utterance. In another preferred embodiment, approximating conditional probabilities further comprises classifying the at least one parameter using a maximum entropy discriminative classifiers.

It will be clear to a skilled artisan that the present invention relates to a discriminative framework for automatic dialog act tagging. In a preferred embodiment of the invention, the discriminative framework for automatic dialog act tagging utilizes maximum entropy modeling. The robustness of the present invention has been demonstrated by testing on well-known corpora, the Maptask corpus and the Switchboard-DAMSL corpus, which for the purposes of testing the present invention provide sample user utterances. It has been found that the present invention is especially robust in the use of lexical, syntactic and prosodic cues.

As stated above, in preferred embodiments within the scope of the present invention the at least one parameter comprises an acoustic-prosodic feature. Prosody is integrated into the modeling framework of various embodiments within the scope of the present invention by Syntax-based categorical prosody prediction from an automatic prosody labeler. Prosody is also integrated into the modeling framework of embodiments of the invention by a novel method comprising modeling a continuous acoustic-prosodic observation sequence as a discrete sequence through the means of quantization. The prosodic feature integration according to these embodiments results in a relative improvement of 19.03% over using conventional acoustic correlates of prosody on the Switchboard-DAMSL corpus.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
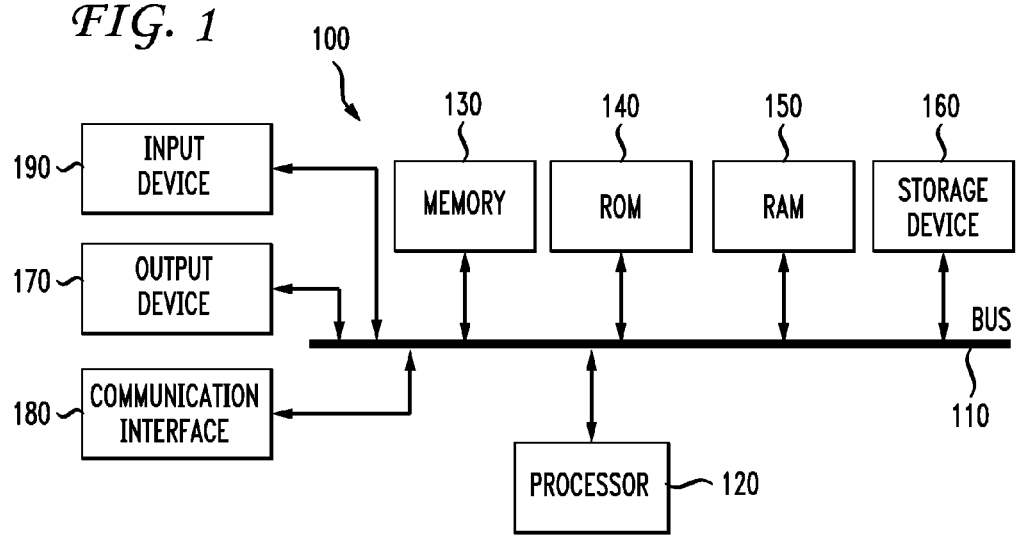
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The present invention has been tested using two corpora, which have been extensively used for dialog act tagging, Maptask, and Switchboard-DAMSL. In the broadest sense, these two corpora provide sample user utterances.

More specifically, Maptask is a cooperative task involving two participants. The two speakers, instruction giver and instruction follower engage in a dialogue with the goal of reproducing the instruction giver's route on the instruction follower's map. The original dataset was slightly modified for the experiments. The raw move information was augmented with the speaker information and non-verbal content (e.g., laughs, background noise) was removed. The Maptask tagging scheme has 12 unique dialog acts; augmented with speaker information this results in 24 tags. The corpus consists of 128 dialogs and 26181 utterances. A ten-fold cross validation was employed for testing the present invention.

The Switchboard-DAMSL corpus consists of 1155 dialogs and 218,898 utterances from the Switchboard corpus of telephone conversations, tagged with discourse labels from a shallow discourse tagset. The original tagset of 375 unique tags was clustered to obtain 42 dialog tags. A set of 173 dialogs, selected at random was used for testing. The experiments were performed on the 42 tag vocabulary as well as a simplified tagset consisting of 7 tags. We grouped the 42 tags into 7 disjoint classes, based on the frequency of the classes and grouped the remaining classes into an "Other" category constituting less than 3% of the entire data. Such a simplified grouping is more generic and hence useful in speech applications that require only a coarse level of dialog act representation. The Switchboard-DAMSL scheme splits long utterances into slash units. Thus, a speaker's turn can be divided in one or more slash units and a slash unit can extend over multiple turns. This is illustrated below:

sv B.64 utt3: C but, F uh — b A65 utt1: Uh-huh. /

+B.66 utt1: —people want all of that / sv B.66 utt2: C and not all of those are necessities.

b A.67 utt1: Right./

The labeling in Switchboard-DAMSL was performed on the basis of the whole slash unit, which makes the disfluency turn in B.64, for example, a Statement opinion (sv) rather a non-verbal token.

In a preferred embodiment of the invention, a discriminative classifier is employed. When a discriminative classifier is employed, the labeling in Switchboard-DAMSL can introduce noisy data because the context associated with the current labeling decision can appear later in the dialog. Hence, when a discriminative classifier is employed, it is preferable to use at least two classifiers. It is particularly preferred to utilize (i) at least one non-merged classifier, i.e., at least one classifier that simply propagates the same label to each continuation, across slash units; and (ii) at least one merged classifier, i.e., at least one classifier that combines the units in one single utterance.

According to embodiments within the scope of the present invention, a chunk based model for dialog act tagging can be employed. In such embodiments, the prediction problem can be modeled as a classification task in the following manner: given a sequence of utterances $u_i$ in a dialog $U=u_1, u_2, \ldots, u_n$ and a dialog act vocabulary ($d_i \in D$), the best dialog act sequence $D^* = d_1, d_2, \ldots, d_n$ would need to be predicted. Embodiments of the present invention utilize a classifier to assign to each utterance a dialog act conditioned on a vector of at least one parameter, for example, local contextual (lexical, syntactic, prosodic) features ($\Phi$). The conditional probability can then be approximated to be within a bounded n-gram context. Thus, $$D^* = \arg\max_D P(D \mid U) \approx \arg\max_D \prod_i^n p(d_i \mid \Phi) \tag{1}$$

In a preferred embodiment of the invention, approximating the conditional probabilities further comprises classifying at least one parameter in the user utterance by using maximum entropy discriminative classifiers. It is possible to estimate the conditional distribution $P(d_i|\Phi)$ by choosing the maximum entropy (maxent) distribution that estimates the average of each feature over the training data. This estimation can be written, for example, in terms of Gibbs distribution parameterized with weights $\lambda$, where V is the size of the dialog act tag set. Hence, $$P(d_i \mid \Phi) = \frac{e^{\lambda_{d_i} \cdot \Phi}}{\sum_{i=1}^{V} e^{\lambda_{d_i} \cdot \Phi}} \tag{2}$$

Additionally, the machine learning toolkit LLAMA can be used to estimate the conditional distribution using maxent. LLAMA encodes multiclass maxent as binary maxent to increase the training speed and to scale the method to large data sets. Each of the V classes in the tag set V is encoded as a bit vector such that, in the vector for class i, the $i^{th}$ bit is one and all other bits are zero. Finally, V one-versus-other binary classifiers can be used as follows.

$$P(y \mid \Phi) = 1 - P(\bar{y} \mid \Phi) = \frac{e^{\lambda_y \cdot \Phi}}{e^{\lambda_y \cdot \Phi} + e^{\lambda_{\bar{y}} \cdot \Phi}} \tag{3}$$

where $\lambda \bar{y}$ is the parameter vector for the anti-label $\bar{y}$. To compute $P(l_i|\Phi)$, it is possible to use the class independence assumption and to require that $y_i=1$ and for all $j\neq i$, $y_j=0$.

$$P(d_i | \Phi) = P(y_i | \Phi) \prod_{j \neq i}^{V} P(y_j | \Phi) \quad (4)$$

The at least one parameter in the user utterance can further comprise lexical and syntactic cues. Lexical cues comprise speaker information, word trigrams from current and previous utterances. Syntactic cues comprise parts-of-speech and supertagged utterances. Supertags comprise predicate-argument information in a local structure. Supertags are composed with each other using substitution and adjunction operations of Tree-Adjoining Grammars (TAGS) to derive a dependency analysis of an utterance and its predicate-argument structure. According to embodiments within the scope of the present invention, it is preferable to use only static features that are derived from the local context of the text being tagged, thereby obviating the need to search for the globally optimal sequence as in the case of using dynamic features. This limitation is especially suitable for dialog act tagging during dialog management, as the prediction is done incrementally rather than waiting for the entire dialog before decoding.

In addition to the lexical and syntactic cues, the at least one parameter in the user utterance can further comprise categorical prosody. Such categorical prosody can, for example, be predicted from an automatic prosody labeler, as previously discussed, to tag the utterances with prosodic labels. Such a prosody labeler can use, for example, lexical and/or syntactic information to predict binary pitch accent (accent, none) and/or boundary tone (btone, none) labels for each word in the user utterance. The prosody labeler was trained on the entire Boston University Radio News corpus. Even though the domain is not the same as that of the test corpora, it would be expected that the syntactic information in the form of POS and Supertags would provide a reasonable feature representation for prosody detection. Moreover, the syntax-based prosody labeler would be expected to offer additional discriminatory evidence above the lexical and syntactic features, as the mapping between prosody and syntax is non-linear. The results are presented in Table 1.

TABLE 1

Dialog act tagging accuracies (in %) on Maptask and Switchboard-DAMSL corpora for lexical and syntactic cues

| Cues used (current utt) | Maptask | SWBD-DAMSL | |
|---|---|---|---|
| | 12 moves | 42 tags | 7 tags |
| Chance (majority tag) | 15.6 | 39.9 | 54.4 |
| Lexical | 65.7 | 69.7 | 81.9 |
| Lexical + Syntactic + Syntax-based prosody | 66.6 | 69.9 | 82.1 |

The at least one parameter in the user utterance can also comprise acoustic-prosodic features obtained from the acoustic signal in dialog act tagging. Embodiments within the scope of the present invention provide methods and systems to model and exploit these acoustic-prosodic features. Such exploitation is valuable given that most dialog act classification tasks are typically performed with a front-end speech interface.

Experiments relating to the modeling and exploitation of the acoustic-prosodic features obtained from the acoustic signal in dialog act tagging were performed only on the Switchboard-DAMSL dataset, because the Maptask corpus is not accompanied by utterance level segmentation. Utterance level segmentation for the Switchboard-DAMSL annotations were obtained from the Mississippi State resegmentation of the Switchboard corpus. The pitch (f0), and RMS energy (e) of the utterance were computed over 10 msec frame intervals. Both the energy and the pitch were normalized with speaker specific means and variances. The length of the utterance was also used as a feature.

The continuous acoustic-prosodic observation sequence can be modeled as a discretized sequence through the means of quantization. This computation can, for example, be performed on the normalized pitch and energy extracted from the last 100 frames (1s) of each utterance. (It has been empirically found that 100 frames (1s) was sufficient to capture the patterns in f0 and energy. Others have reported that using a 200 ms window in the end and penultimate regions, respectively, captures the patterns reasonably well.) The quantized acoustic stream is then used as a feature vector and the conditional probabilities are approximated by an n-gram model. For this case, Equation (1) becomes, $$D^* \approx \arg\max_D \prod_i^n p(d_i | \Phi) = \arg\max_D \prod_i^n p(d_i | a_i) \quad (5)$$

where $a=\{a^1, \ldots, a^k\}$ is the acoustic-prosodic feature sequence for utterance u and the variable k is the number of frames used in the analysis. Quantization of the prosodic features (both temporal and feature scales) is shown below:

| Normalized pitch contour values: | | | | | | |
|---|---|---|---|---|---|---|
| −3.2595 | 0.2524 | 0.3634 | 0.2558 | 0.1960 | 0.1728 | 0.1845 |
| Quantization (precision 2): | | | | | | |
| −3.25 | 0.25 | 0.36 | 0.25 | 0.19 | 0.17 | 0.18 |
| Quantization (precision 1): | | | | | | |
| −3.2 | 0.2 | 0.3 | 0.2 | 0.1 | 0.1 | 0.1 |

The quantization while being lossy, reduces the vocabulary of the acoustic-prosodic features, and hence offers better estimates of the conditional probabilities. The quantized acoustic-prosodic cues can then be modeled using the maximum entropy model as previously described. Such an n-gram model of quantized continuous features is similar to representing the acoustic-prosodic features with a piecewise linear fit as done in the tilt intonational model. In a preferred embodiment, the choice of appropriate representations of the pitch and energy features related to the maximum entropy discriminative classifier is preferred as opposed to extracting features such as f0 mean, range, slope of regression line, etc. The results of using the acoustic-prosodic features is presented in Table 2, which illustrates dialog act tagging accuracies (in %) on the Switchboard-DAMSL corpora for acoustic-prosodic cues (only current utt was used). All results are for quantization precision of 2.

TABLE 2

| Cues used | Switchboard-DAMSL | |
|---|---|---|
| | 42 tags | 7 tags |
| Acoustics only | 54.4 | 69.4 |
| Lexical + Syntactic + Syntax-based prosody + Acoustics | 70.4 | 82.5 |
| Lexical + Syntactic + Syntax-based prosody + Acoustics (3 prev utt) | 72.0 | 82.6 |

Figure 2:
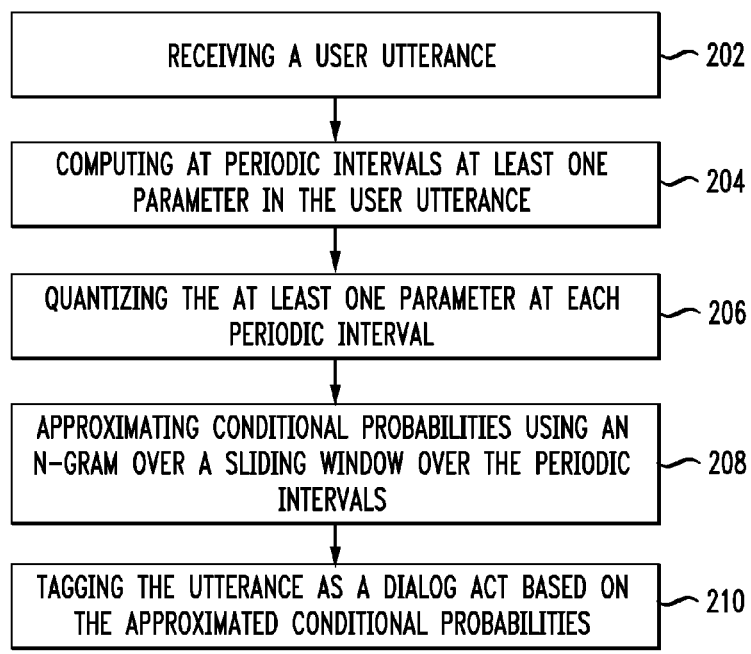
FIG. 2 illustrates an example method embodiment of the invention.

Other embodiments within the scope of the invention relate to methods for exploiting information in an utterance for dialog act tagging. One such method is illustrated, by way of non-limiting example, in FIG. 2. The illustrated method provides for receiving a user utterance (202), computing at periodic intervals at least one parameter of the user utterance (204), quantizing the at least one parameter at least at periodic intervals (206), approximating conditional probabilities using an n-gram over a sliding window over the periodic intervals (208) and tagging the utterances as a dialog act based on the approximating conditional probabilities (210).

The at least one parameter may comprise a pitch and an energy as well as other parameters. The pitch and energy may both be normalized while in one aspect of the invention only the pitch is quantized. It is preferable that the conditional probability is further approximated based on a length of the utterance but also may be approximated based on other factors such as at least one acoustic prosodic, lexical, syntactic, and syntax-based prosodic cue, prosody, sound, volume and so forth. It is also preferable to use the quantized at least one parameter at the periodic interval over at least a portion of the utterance as a feature vector for a user with the n-gram model. The step of approximating conditional probabilities may further be performed by classifying the at least one parameter using a maximum entropy discriminative classifier.

The present invention is in no way limited to transcribed speech. To the contrary, the acoustic-prosodic feature modeling framework of the present invention can be used on the acoustic signal corresponding to any single utterance without knowledge of lexical identity. Using the acoustic-prosodic feature by itself results in an accuracy of 54.4%, still significantly better than chance. It is interesting to note that use of acoustic-prosodic, lexical, syntactic, syntax-based categorical prosodic cues progressively improves the dialog act tagging performance in that order. It is also important to note that all the experiments were performed on the complete tagset (42 dialog acts for Switchboard-DAMSL and 12 for Maptask).

The syntax-based prosodic cues offer a marginal improvement on the Maptask corpus, slightly better than previously published results. However, the acoustic-prosodic features modeled through the inventive framework offers as much as 19.03% relative improvement over using traditional acoustic correlates of prosody. The proposed acoustic-prosodic maximum entropy model on the quantized feature values is a simple but very effective technique. The quantization precision can be adjusted based on the amount of available training data. The experimental results also demonstrate that it is better to leave the choice of the most discriminative acoustic-prosodic feature representation to the maximum entropy classifier rather than using representations of the prosodic contour based on heuristics (f0 slope, maximum value, range, etc.).

Even though the merged classifier breaks the structure of regular dialog, it performs consistently better than the non-merged classifier. While performing dialog act tagging on merged utterances is not plausible in a real conversation, it can be used for off-line tagging of archived meetings or lectures.

As shown in Table 2, the use of lexical, syntactic and prosodic features results in an accuracy of 72.0%. This makes the present invention ideal for real-time dialog act detection and the discriminative framework further strengthens the proposed scheme as it obviates the need for searching for a globally optimal sequence, thus, avoiding latency.

A preferred embodiment of the present invention provides a discriminative framework for dialog act detection using maximum entropy modeling and demonstrated the integration of prosodic cues in addition to lexical and syntactic cues. The proposed prosodic feature integration results in a relative improvement of 19.03% over using conventional representation of the prosodic contour for dialog act tagging. The performance of using the lexical, syntactic and prosodic features results in 72.0% accuracy, making the present invention suitable for real-time automatic dialog act tagging in dialog managers.

Embodiments within the scope of the present invention may also include non-transitory and transitory computer-readable media for carrying or having computer-executable instructions or data structures stored thereon. Such computer-readable media can be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other non-transitory medium which can be used to carry or store desired program code means in the form of computer-executable instructions or data structures. When information is transferred or provided over a network or another communications connection (either hardwired, wireless, or combination thereof) to a computer, the computer properly views the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method for exploiting information in an utterance for dialog act tagging, the method comprising:
   receiving a user utterance;
   computing via a processor at periodic intervals at least one parameter in the user utterance;
   quantizing the at least one parameter at each periodic interval of the periodic intervals;
   approximating conditional probabilities using an n-gram over a sliding window over the periodic intervals; and
   tagging the utterance as a dialog act based on the approximated conditional probabilities.

2. The method of claim 1, wherein the at least one parameter comprises a pitch and an energy.

3. The method of claim 2, wherein the energy and pitch are normalized and only the pitch is quantized.

4. The method of claim 1, wherein the conditional probability is further approximated based on a length of the utterance.

5. The method of claim 1, wherein the quantized at least one parameter at the periodic intervals over at least a portion of the utterance are used as a feature vector for a user with the n-gram model.

6. The method of claim 1, wherein approximating conditional probabilities further comprises classifying the at least one parameter using a maximum entropy discriminative classifiers.

7. The method of claim 1, wherein the at least one parameter is an acoustic-prosodic feature.

8. The method of claim 1, wherein the at least one parameter comprises at least one of acoustic-prosodic, lexical, syntactic, and syntax-based prosodic cues.

9. A system for exploiting information in an utterance for dialog act tagging, the system comprising:
   a first module configured to control a processor to receive a user utterance;
   a second module configured to control the processor to compute at periodic intervals at least one parameter in the user utterance;
   a third module configured to control the processor to quantize the at least one parameter at each periodic interval;
   a fourth module configured to control the processor to approximate conditional probabilities using an n-gram over a sliding window over the periodic intervals; and
   a fifth module configured to control the processor to tag the utterance as a dialog act based on the approximated conditional probabilities.

10. The system of claim 9, wherein the at least one parameter comprises a pitch and an energy.

11. The system of claim 10, wherein the energy and pitch are normalized and only the pitch is quantized.

12. The system of claim 9, wherein the conditional probability is further approximated based on a length of the utterance.

13. The system of claim 9, wherein the quantized at least one parameter at the periodic intervals over at least a portion of the utterance are used as a feature vector for a user with the n-gram model.

14. The system of claim 9, wherein the fourth module is further configured to control the processor to classify the at least one parameter using a maximum entropy discriminative classifier.

15. The system of claim 9, wherein the at least one parameter is an acoustic-prosodic feature.

16. The system of claim 9, wherein the at least one parameter comprises at least one of acoustic-prosodic, lexical, syntactic, and syntax-based prosodic cues.

17. A non-transitory computer-readable medium storing instructions for controlling a computer device to exploit information in an utterance for dialog act tagging, the instructions comprising:
   receiving a user utterance;
   computing at periodic intervals at least one parameter in the user utterance;
   quantizing the at least one parameter at each periodic interval;
   approximating conditional probabilities using an n-gram over a sliding window over the periodic intervals; and
   tagging the utterance as a dialog act based on the approximated conditional probabilities.

18. The non-transitory computer-readable medium of claim 17, wherein the at least one parameter comprises a pitch and an energy.

19. The non-transitory computer-readable medium of claim 17, wherein the conditional probability is further approximated based on a length of the utterance.

20. The non-transitory computer-readable medium of claim 17, wherein the quantized at least one parameter at the periodic intervals over at least a portion of the utterance are used as a feature vector for a user with the n-gram model.

* * * * *